(12) United States Patent
Lieberman

(10) Patent No.: US 6,670,421 B1
(45) Date of Patent: Dec. 30, 2003

(54) OLEFIN-POLYAMIDE THERMOPLASTIC ALLOY AND PROCESS FOR MAKING THE SAME

(75) Inventor: Mark Lieberman, Bloomfield Hills, MI (US)

(73) Assignee: ACI Technologies, LLC, Flint, MI (US)

( * ) Notice: Subject to any disclaimer, the term of this patent is extended or adjusted under 35 U.S.C. 154(b) by 87 days.

(21) Appl. No.: 09/921,773

(22) Filed: Aug. 3, 2001

(51) Int. Cl.$^7$ ................................................ C08L 83/04
(52) U.S. Cl. ........................ 525/101; 525/106; 528/261; 528/268
(58) Field of Search ................................ 525/106, 101; 528/261, 268

(56) References Cited

U.S. PATENT DOCUMENTS

| | | | |
|---|---|---|---|
| 4,444,817 A | * 4/1984 | Subramanian | 428/36 |
| 5,006,601 A | 4/1991 | Lutz et al. | 525/66 |
| 5,073,590 A | 12/1991 | Abe et al. | 524/449 |
| 5,234,993 A | 8/1993 | Huynh-Ba | 525/66 |
| 5,602,200 A | 2/1997 | Wissmann | 525/66 |
| 5,874,176 A | 2/1999 | Kamei et al. | 428/474.4 |
| 6,117,561 A | 9/2000 | Jacquemet et al. | 428/475.5 |

* cited by examiner

*Primary Examiner*—Ana Woodward
(74) *Attorney, Agent, or Firm*—Young & Basile, P.C.

(57) ABSTRACT

A polymeric composition and process for making the same suitable for injection molding processes and procedures containing an olefinic polymer component selected from at least one a group which includes polyalkylenes, copolymers of polyalkylenes and a thermoplastic polyamide. The polyamide and olefinic polymeric components are present in random orientable locations in the initial polymeric composition. When injection molded against a temperature gradient, the resulting workpiece composed of the composition has distinctive regions of elevated polyamide concentration proximate the outwardly oriented surface and distinctive regions of elevated olefinic polymeric concentration proximate to interior regions of the workpiece.

22 Claims, 2 Drawing Sheets

```
┌─────────────────────────────────┐
│  INTRODUCING POLYAMIDE MATERIAL │
│      INTO COMPOUNDING VESSEL    │
└─────────────────────────────────┘

┌─────────────────────────────────┐
│    AGITATING POLYAMIDE MATERIAL │
│      AND ELEVATING TEMPERATURE  │
└─────────────────────────────────┘

┌─────────────────────────────────┐
│    ADDING POLYOLEFIN MATERIAL   │
│       TO POLYAMIDE RESIDENT     │
│        IN COMPOUNDING VESSEL    │
└─────────────────────────────────┘

┌─────────────────────────────────┐
│     MAINTAINING POLYAMIDE AND   │
│        POLYOLEFIN AT SECOND     │
│   TEMPERATURE TO MELT POLYOLEFIN│
└─────────────────────────────────┘

┌───────────────────────────────────────┐
│  COMPOUNDING MATERIAL TO ACCOMPLISH   │
│ RANDOM DISPERSION OF DISCRETE REGIONS │
│   OF POLYAMIDE IN POLYOLEFIN MATRIX   │
└───────────────────────────────────────┘

┌─────────────────────────────────┐
│      COOLING DISPERSION TO      │
│     SOLIDIFICATION TEMPERATURE  │
└─────────────────────────────────┘
```

*FIG. 1*

OLEFIN-POLYAMIDE THERMOPLASTIC ALLOY AND PROCESS FOR MAKING THE SAME

FIELD OF THE INVENTION

The present invention relates to a unique polymeric material composed of polyamides and polyalkylene constituents and methods for making the same. More particularly, the present invention pertains to polymeric materials which contain polyamides and polyalkylenes in an alloyed relationship which permits orientation of polyamide and polyalkylene functionalities resultant to molding processes. Even more particularly, this invention pertains to alloys made up of polypropylene and polyamide constituents heretofore considered to have less than optimal compatibility.

BACKGROUND OF THE INVENTION

The need and demand for molded polymeric component parts is significant. Such component parts provide functional versatile, low-cost, lightweight solutions for many elements in a myriad of products from automotive vehicles to construction components to decorative objects. Various molding techniques exist to process various thermoplastic and thermosetting materials into finished components. The choice of polymeric material is generally governed by factors which include the type of molding process to be employed and the physical characteristics which the finished component must possess. Such characteristics can include, but are not limited to, strength, flexibility, weatherability and resistance to degradation upon prolonged exposure to harmful elements such as UV light, ozone etc. Desirable material characteristics can also include the ability to withstand repeated fluctuations in temperature as well as upper and lower service limits compatible for the use to which the components are to be put. Additionally, there is a great demand for moldable polymeric compounds and formulations which will provide desirable characteristics such as scratch resistance, abrasion resistence, and optimum paintablity normally attributed to the "harder" melt processible thermoplastic polymeric materials together with overall flexibility typically found in "softer" polymeric compounds.

All too often, the compromise between desired physical characteristics is one which cannot be satisfactorily achieved or can only be attained in a cost intensive and or labor intensive manner. For instance, in situations where external surface scratch resistance and all-body flexibility and/or general strength is required, it has generally been thought that multi-layer laminates of various polymeric materials may be the solution. Other solutions include the use of various paints, lacquers or other surface tougheners applied in bonded relationship to the softer substrate in order to provide characteristics such as enhanced scratch resistance and the like. This is problematic as such applied coatings and/or bonded laminates require careful surface preparation and are susceptible to scratching or peeling over the life of the part or component.

Compositions have been proposed which include two or more different polymeric compositions in order to obtain desirable combinations such as scratch and mar resistance, paintability, etc. Unfortunately, multi polymer compositions often exhibit undesirable flow characteristics during melt processing and yield finished parts with undesirable performance characteristics. These undesirable surface performance characteristics include, but are not limited to, delamination of some or all of the surface layer of the part produced.

There are also situations in which it is desirable to prepare polymeric parts which are colored or pigmented. This can be problematic in situations where multipolymer compositions are employed. In many situations, polymeric parts or components made through injection molding processes exhibit uneven pigmentation. This phenomenon can be due to uneven or inappropriate polymer flow characteristics during part formation. In other situations, it is desirable to provide a polymer which can incorporate specialty aesthetic additives such as metal flake in a pigmented or non-pigmented substrate in a manner which is aesthetically homogeneous and which does not materially impair or compromise key functional characteristics of the material such as strength and durability.

In order to process dissimilar polymers to form polymeric compounds suitable for use in molding processes such as injection molding, it has heretofore been considered necessary to employ significant quantities of compatibilizing agents such as maleic anhydride functionalizing agents to functionalize the polymeric components and facilitate bonding. These materials have been considered mandatory to permit the two or more dissimilar polymeric materials to blend effectively in initial formulation steps and to process effectively in the subsequent part formation steps such as injection molding processes.

Historically, it was considered common knowledge that omission of such functionalizing agents would result in the failure of the two or more materials to melt process in a compatible manner. It was believed that functionalizing agents such as maleic anhydride permitted polymeric materials having vastly different properties such as melt temperature and the like to blend, melt and reform effectively upon subsequent heating and processing. Such functionalizing agents are typically so effective that an essentially uniform polymeric blend results. This compromises any potential for ordered orientation of individual polymer components in subsequent molding or polymer forming operations.

Thus, it would be desirable to provide a melt processible polymeric composition which is composed of two or more polymeric components which, when subjected to molding operations such as injection molding or extrusion, provides a finished product or part which exhibits at least one of the following characteristics:

a) scratch and mar resistance in the surface of the finished product produced from the material;

b) surface characteristics of the finished part which contribute to direct paint ability, i.e. adhesion of paint and/or other applied materials to the surface of the produced part without requiring the use of an adhesion promoter and/or a tie coat c) mold in color capability, i.e. the ability to integrate coloring agents such as pigments into the material at a point prior to molding or melt processing into the finished part;

d) enhanced exterior weatherability;

e) enhanced or elevated resistance to heat and/or other environmental hazards.

It is also desirable that the melt processible polymeric material thus formed be one which retains key characteristics of the individual component materials upon processing and mold formation. It is also desirable to provide a melt processible polymeric material which can contain at least two essentially non-compatible polymeric materials in orientable alloyed relationship to each other. Finally it is desirable to provide a polymeric composition which permit or promotes migration of one polymer relative to another during the molding or other melt processing operations such as extrusion.

SUMMARY OF THE INVENTION

The present invention is directed to a polymeric composition which is suitable for use in injection molding processes and procedures. The polymeric composition contains, as a major portion, an olefinic polymer component selected from at least one a group which includes polyalkylenes, copolymers of polyalkylenes, in which at least one monomeric unit of the polymer contains between 2 and 6 carbon atoms. The polymeric composition of the present invention contains, as a minor portion, a thermoplastic polyamide, with polyamides such as polyamide 6, polyamide 6,6, polyamide 11 and polyamide 12 being preferred. The polyamide and olefinic polymeric components are present in random orientable locations in the initial polymeric composition.

The polymeric composition of the present invention possesses unique orientation characteristics when injection molded against a temperature gradient such that the resulting workpiece has distinctive regions of elevated polyamide concentration proximate the outwardly oriented surface and distinctive regions of elevated olefinic polymeric concentration proximate to interior regions of the workpiece.

BRIEF DESCRIPTION OF THE DRAWINGS

The description herein makes reference to the accompanying drawings wherein like reference numerals refer to like parts throughout the several views, and wherein:

FIG. 1 is a process diagram of the formulation method of the present invention.

DESCRIPTION OF THE PREFERRED EMBODIMENT

Figure 2:
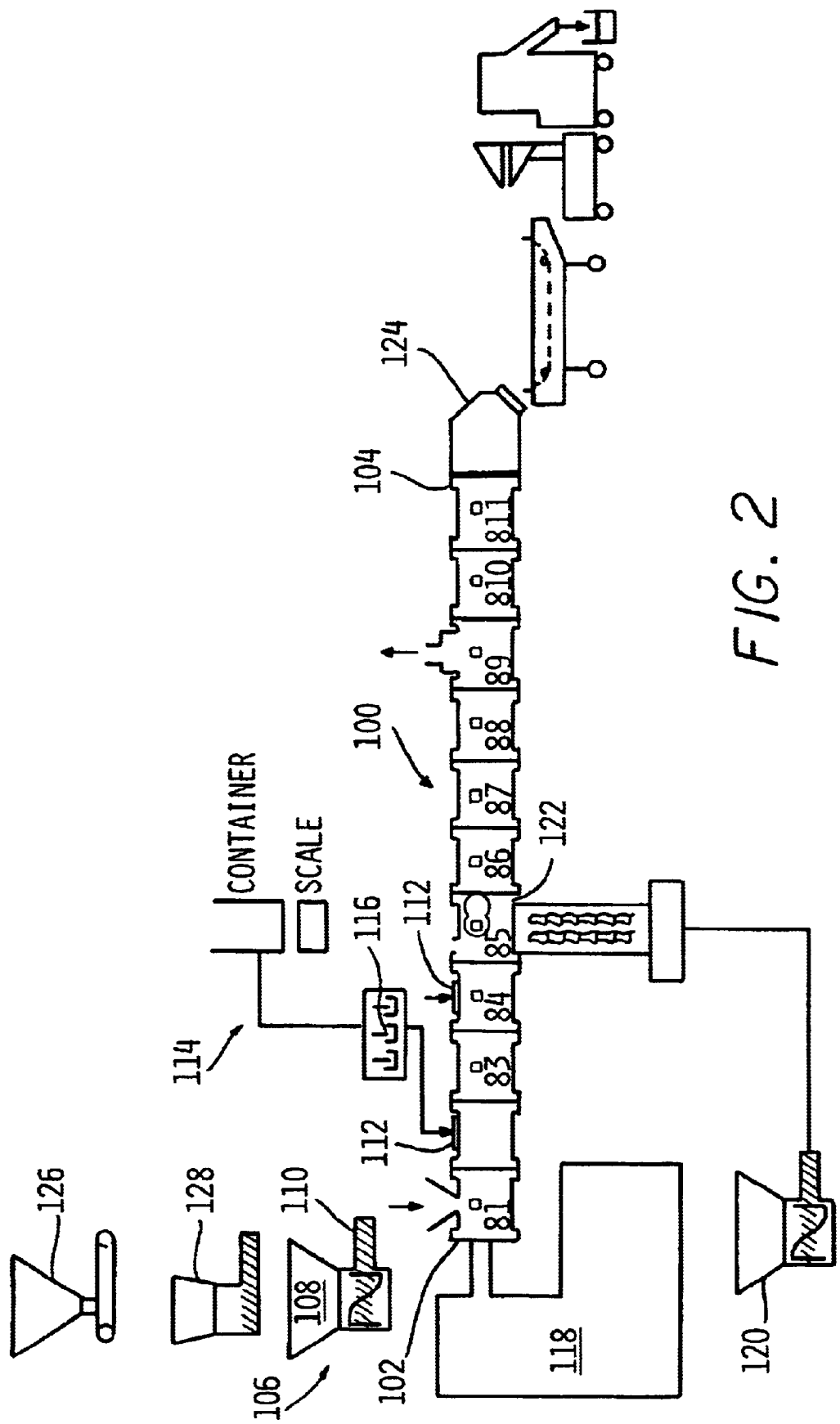
FIG. 2 is a schematic diagram of the formulating apparatus of the present invention.

The present invention is predicated on the unexpected discovery that a melt processible thermoplastic composition can be prepared which contains at least two thermoplastic materials which have heretofore been considered unable to be combined in a composition suitable for melt processes such as injection molding (herein referred to as "molding") and extrusion. More specifically, the present invention is predicated on the discovery that at least two distinct thermoplastic materials can be successfully compounded in a combination which can be advantageously employed in melt processing operations such as injection molding and extrusion. Such polymeric materials can retain identifiable characteristics of the ingredient components and exhibit orientation of the identifiable components during the subsequent molding procedure.

The thermoplastic composition of the present of the present invention contains a major portion of an thermoplastic olefinic polymer component and a minor portion of a thermoplastic polyamide polymer present in an alloyed relationship therewith.

As used herein, the term "alloyed relationship" and "alloy" are taken define a randomly oriented dispersion of the minor component in the major component in a manner which facilitates the orientation of the respective component relative to one another upon the application of external forces such as pressure and heat. In the alloyed relationship of the major and minor components in the composition of the present invention, the at least two respective materials exhibit little significant inter-component cross linking or bonding between one another. Rather, it is theorized that the major and minor component are present in an amorphous amalgam-like state in which the minor component resides in discrete microcells within the major component matrix.

The olefinic polymer employed as the major component is a material selected from at least one of polyalkylenes and copolymers of polyalkylenes. Such materials are contemplated to include polyalkylene homopolymers as well as copolymeric materials which contain polyalkylene constituents. Such materials are broadly recognized in the art of injection molding as thermoplastic polyolefins (TPOs). In the polymeric composition and the process of the present invention, at least one alkylene monomeric unit which makes up the homopolymeric or copolymeric group, preferably, contains 2 to 6 carbon atoms in branched or unbranched monomeric units, with alkylene monomers having two three or four carbon atoms being preferred and polymers having at least some propylene groups being most preferred.

Polyolefins suitable for use in the compositions of the invention include non-polar thermoplastic, crystalline or semi-crystalline polyolefin homopolymers and copolymers. They are prepared from monoolefin monomers having 2 to 6 carbon atoms, such as ethylene, propylene, 1-butene, isobutylene, 1-pentene and the like, with ethylene, propylene and mixtures thereof being preferred. The polyethylene can be low density, ultra-low density or high density material. The term polypropylene includes homopolymers of propylene as well as reactor copolymers of polypropylene which can contain about 1 to about 20 weight percent of ethylene or various-olefin comonomer of 4 to 16 carbon atoms, and mixtures.

Typically, the polymeric composition and process of the present invention utilize polypropylene homopolymers and/or copolymers of polypropylene with the propylene. It is contemplated that the olefinic component include polypropylenes and/or copolymers of polypropylene of various molecular weights either alone or in combination with the only stipulation being that the polypropylene material be capable of processing in the manner to be described subsequently and can be successfully utilized in the injection molding processes contemplated in the present disclosure.

It is to be understood that, by this disclosure, it is contemplated that the thermoplastic polyolefin, or more particularly, the thermoplastic polypropylene can be present as a homopolymer. As used herein the term "homopolymer" is taken to mean a polymeric material derived from a single monomer. It is also contemplated that the thermoplastic polyolefin, or more particularly, the thermoplastic polypropylene may be present as a copolymer. As used herein the term "homopolymer" is taken to mean a polymeric material which is derived by the polymerization of two or more dissimilar materials. It is contemplated that the polymeric material may be the result of copolymerization of propylene with polypropylene, other olefins or other materials which will yield a resulting polymeric compound having characteristics suitable for incorporation in the present invention.

The olefinic compound of choice will typically be one which has a melt flow index below that of the polyamide component employed in the composition. The deferential between melt flow indices for the respective polyolefin and polyamide component will be typically be dictated by the end use to which the polymeric composition of the present invention is to be put, i.e. the type of part and molding operation undertaken. Thus, the differential between the melt flow indices may be as little as one or as great as required to achieve migratory orientation of the two respective materials in the forming operation. For example, in certain applications, a polyolefin having a melt flow index between 8 and 12 might be employed in combination with a polyamide having a melt flow index between 20 and 28. The polyolefin may have a melt flow index typical for that material provided it is sufficiently below the melt flow index of the polyamide to permit migratory orientation of polyolefin relative to polyamide upon molding or extrusion operations. Specific differentials in melt flow index will be discernable to the skilled artisan familiar with injection and/or extrusion are in view of the present disclosure.

In the present invention, the polymeric composition contains a major portion of the polyolefin compound. As the term "major portion" is used herein, it is defined as an amount greater than the amount of any other compound employed in the polymeric composition. The amount of polyolefin component employed in the polymeric compound of the present invention is that amount which will impart polyolefinic characteristics to the core region of the molded workpiece so formed and will permit the expression of characteristics typically associated with polyamide materials in the region proximate to the outwardly oriented surface of the workpiece. Preferably, the olefinic compound is present in an amount between 40 and 95% by material weight, with an amount between 65 and 85% being preferred.

The polymeric composition of the present invention also contains a minor portion of a thermoplastic polyamide. Suitable thermoplastic polyamides (nylons) include crystalline or resinous polymers (including copolymers and terpolymers) having recurring amide units within the polymer chain. Polyamides may be prepared by polymerization of one or more epsilon lactams such as caprolactam, pyrrolidone, lauryllactam and aminoundecanoic lactarn, or amino acid, or by condensation of dibasic acids and diamines are contemplated within the purview of this invention. Both fiber-forming and molding grade nylons are suitable, with molding grades being preferred.

Examples of such polyamides are polycaprolactam (nylon 6), polylauryllactam (nylon 12), polyhexamethylenedipamide (nylon 6,6), polyhexamethyleneazelamide (nylon 6,9), polyhexamethylenesebacamide (nylon 6,10), polyhexamethyleneisophthalamide (nylon 6,IP) and the condensation product of 11-aminoundecanoic acid (nylon 11).

Additional examples of satisfactory polyamides (especially those having a softening point below 275° C.) are described in Kirk-Othmer, Encyclopedia of Chemical Technology, 3d edition, vol. 18, pages 406–409, and Encyclopedia of Polymer Science and Engineering, 2d edition, vol. 11, pages 445–450. Commercially available thermoplastic polyamides may be advantageously used in the practice of this invention, with linear crystalline polyamides having a softening point or melting point between 160° C. and 260° C. being preferred. The preferred thermoplastic polyamide polymer employed as a minor component in the present invention is selected from at least one of nylon 6, nylon 6,6, nylon 11, and nylon 12, with nylon 6 being most preferred.

It is to be understood that, by this disclosure, it is contemplated that the thermoplastic polyamide, can be present as a homopolymer or suitable copolymer as these terms have been defined in the present application. Representative characteristics of thermoplastic polyamide materials suitable for use in the present invention are those typically associated with melt processible polyamides. As indicated previously, the polyamide of choice will have a melt flow index greater than the polyolefin of choice. In certain end use applications, it is envisioned that the differences in melt flow indices may be as little as 1. Other greater differences in melt flow index would be employed depending on the part formation process to be employed. As a non-binding example, it is envisioned that lower melt flow index differentials could be utilized in parts having less mass or in parts prepared by extrusion processes. Greater melt flow index differentials could be employed in formation of parts utilizing certain injection molding processes as would be known to the skilled artisan upon reading this specification.

The polymeric composition of the present invention contains a minor portion of the polyamide component. As the term "minor portion" is used herein, it is defined as an amount less than the amount of the compound employed in major portion in the polymeric composition. The amount of polyamide component employed in the polymeric compound of the present invention is that amount which will impart signature physical characteristics to the region proximate to the outer surface of the work piece produced by the injection molding process utilizing this material, typically surface hardness, scratch resistance and durability. Preferably, the polymeric compound is present in an amount between 10 and 35% by material weight, with an amount between 15 and 30% being preferred.

In the preferred embodiment, the polymeric material may be present in any physical form which will permit or promote injection molding processes. Typically, the material is present as a granular or pelletized solid in which the minor portion is randomly dispersed within the major portion. The composition is a polyolefin matrix having micron or submicron size polyamide particles dispersed therein.

The material of the present invention may also contain additives which impart increased impact resistance, UV resistance. Thus the part which is formed form the material of the present invention will exhibit many important advantageous characteristics which can include enhanced scratch and mar resistance, increased paintability, mold in color capability, enhanced exterior weatherability and enhanced or elevated resistance to heat.

It has been found, quite unexpectedly, that incorporation of small amounts of materials which are hereafter referred to as "migratory compatibilizers" will enhance the characteristics previously enumerated regarding the performance of the novel polymeric composition. As used herein, the term "migratory compatibilizer" is defined as an organic additive or additives which may impart limited functionality to at least one of the major and/or minor polymeric components present in the composition of the present invention. Without being bound to any theory, it is believed that the migratory compatibilizer or compatibilizers function to permit the minor polymeric component to be maintained in orientable relationship in a matrix relative to the major polymeric portion material in the resulting polymeric composition. In the polymeric composition of the present invention, the minor polyamide polymeric component is maintained in discrete "islands" in the polyolefin matrix prior to molding operations. The migratory compatibilizer may also advantageously facilitate orientation of the components upon external application of an orienting force such as heat. Additionally the migratory compatibilizer may assist in the maintenance of discrete islands in the matrix prior to processing.

These migratory compatibilzers also appear to serve as an organic interstitial agents acting as binding agents between polyamide and polyolefin during injection molding processes. As such, they serve as "platelets" orienting themselves at interstitial junctions between the major and minor polymeric components and providing adjunct binding sites suitable for interaction with the polymeric component.

Suitable primary migratory compatibilizers include classes of silicone oils (also referred to as siloxane or siloxane oils). Suitable materials are compatible with the processing parameters of the formation and molding processes of the present invention. Such materials are generally known in the art relevant to thermoplastic polyolefin processing. However it has been unexpectedly encountered that such materials, when employed in the composition of the present invention and processed by injection molding or extrusion processes will exhibit interstitial migration patterns. By the term "interstitial migration patterns" it is meant that the migratory compatibilizer will migrate and concentrate at locations between polyamide and polypropylene constituents, and more particularly, at locations at the interface between regions of polyamide concentration and polyolefin concentration.

Thus, the migratory compatibilizer of choice will be one having sufficient functionality to align and orient between polyamide-rich regions and polyolefin-rich regions when the compounded material has been subjected to injection molding procedures. Without being bound to any theory, it is believed that migratory compatibilizers such as siloxane oils concentrate in this gradient between the polyamide rich outer skin and the polyolefin-rich interior during the molding process to provide an interstitial mechanical and/or quasi-chemical bonding region in and at the gradient interface between the polyamide rich outer skin and the polyolefin-rich interior.

Primary migratory compatibilizers contemplated herein are organic compounds having organosiloxane functionalities commonly referred to as silicone oils. The organosiloxane material of choice preferably has a viscosity at 25° C. of about 30–100,000 centi-stokes, preferably from 5,000, to 30,000 centi-stokes, and most preferably from 8,000 to 25,000 centi-stokes. Materials between 30 and 1,000 centi-stokes may preferably may preferably include, for example, dimethyl-silicone oil, methylphenylsilicone oil, alpha-methyl-styrene-modified silicone oil, chlorophenylsilicone oil, and fluorinated silicone oil. Examples of silicone oils having higher viscosity values include silicone oils containing a modified siloxane bond, such as polymethylphenylsiloxane, olefin-modified silicone, amide-modified silicone, polydimethylsiloxane, amino-modified silicone, carboxyl-modified silicone, alpha-methylstyrene-modified silicone, polyether-modified silicone modified by polyethylene glycol or polypropylene glycol, olefin/polyether-modified silicone, epoxy-modified silicone, amino-modified silicone and alcohol-modified silicone.

The composition of the present invention may also contain a secondary migratory compatibilizer. The secondary migratory compatibilizer is an organic material which, when added to at least one of the polymeric components, begins the process of rendering the respective materials as migratory compatible. Suitable materials include at least one of maleic anhydride, itaconic anhydride, citraconic anhydride, bicyclo[2,2,1]hepta-5-ene-2,3-dicarboxylic acid anhydride (himic acid anhydride; NBDA), monoethyl maleate, monomethyl fumarate, monomethyl itaconate, dimethylaminoethyl methacrylate, dimethylaminopropyl acrylamide, acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N,N-dibutylamide, maleimide, N-butyl maleimide, N-phenyl maleimide, sodium acrylate, sodium methacrylate, potassium acrylate, potassium methacrylate, etc. Of these, maleic anhydride is most preferably used.

The secondary migratory compatibilizer may also be a suitable polymer incorporating at least one of the enumerated materials. Typically aromatic alkene maliec anhydride rubbers can be employed. Suitable materials include materials such as a copolymer of styrene and maleic anhydride, optionally modified with other monomers and polymers (generally referred to as SMA polymers). Thus the styrene and maleic anhydride can be co-reacted with monomers, such as methyl methacrylate, or polymers, such as polybutadiene. The co-reacted polymers can be blended with other polymers such as ABS polymers (graft-copolymer of acrylonitrile and styrene with polybutadiene and blends of acrylonitrile butadiene copolymer with styrene acrylonitrile copolymer). Suitable SMA polymers are disclosed in U.S. Pat. No. 3,509,110, disclosure of which is incorporated herein by reference. While the patent is directed to a particular process for making the SMA polymer, the patent is appropriate for disclosing the basic SMA polymer composition. Thus, the SMA polymers, basically comprise a copolymer of a vinyl aryl monomer and an ethylenically unsaturated dicarboxylic acid. As shown in the patent the polymer may be formed by reacting the vinyl aryl monomer with a half ester of an ethylenically unsaturated dicarboxylic acid.

Aryl vinyl monomers useful in the making of the SMA polymers include styrene, ortho-methylstyrene, meta-methylstyrene, para-methylstyrene, ethylstyrene, dimethylstyrene, divinylbenzene, alpha-methylstyrene, para-methoxystyrene, para-chlorostyrene, 2,4-dichlorostyrene, 2,5-dichlorostyrene, parabromostyrene, alpha-methyl-p-methylstyrene, para-isopropylstyrene, vinylnaphthalene and the like. Mixtures of two or more of these aryl vinyl monomers may be used if desired.

The half esters of an ethylenically unsaturated dicarboxylic acid are prepared from the following acids: maleic acid, fumaric acid, itaconic acid, citraconic acid, mesaconic acid, ethyl maleic acid, methyl itaconic acid, chloromaleic acid, dichloro-maleic acid, bromomaleic acid, dibromomaleic acid and the like. The half esters are formed from the ethylenically unsaturated dicarboxylic acid or its anhydride (or mixtures of the same) and the desired alcohol. Suitable alcohols are the primary and secondary alkanols containing up to 6 carbon atoms, such as methyl, alcohol, ethyl alcohol, n-propyl alcohol, n-butyl alcohol, sec-butyl alcohol and n-pentyl alcohol; halogenated alkanols having up to 6 carbon atoms, such as 2,3-dichloro-1-propanol and 2-bromo-1-propanol; arylakyl alcohols such as benzyl alcohol; eyelic alcohols having up to 6 carbon atoms, such as cyclopentanol, cyclohexanol and tetrahydrofurfuryl alcohol; ether alcohols such as 2-butoxy ethanol and the ethyl ether of diethylene glycol; phosphorous containing alcohols such as diethyl monobutanol phosphate; nitrogen containing alcohols such as N-N-dimethyl ethanol amine, and the like.

The aryl vinyl monomer and ester of an ethylenically unsaturated dicarboxylic acid or anhydride are reacted in the preparation of about 50 to 95 weight percent monovinyl aromatic compound with the remainder being acid or anhydride.

Other suitable SMA polymers are prepared in accordance with U.S. Pat. No. 4,278,768, the disclosure of which is incorporated herein by reference. This patent teaches that SMA polymers can be prepared by direct copolymerization of a monovinyl aromatic monomer with an ethylenically unsaturated dicarboxylic acid anhydride by continuous controlled addition of the more reactive anhydride monomer to produce the copolymer of the desired composition. The monovinyl aromatic monomers useful in the copolymers are styrene, alpha-methylstyrene, nuclear-methylstyrenes, ethylstyrene, isopropylstyrene, tertbutylstyrene, chlorostyrenes, dichlorostyrenes, vinylnaphthalene and mixtures of these. Suitable anhydrides are the anhydrides of maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid, and mixtures thereof and the like. The anhydride copolymers may contain from 5 to 50 mole percent of anhydride and 95 to 50 mole percent of monovinyl aromatic monomer.

For the rubber-modified copolymers, the starting copolymers may be any of the above anhydride copolymers into which 5 to 40 percent by weight of one of the known rubbers has been incorporated. The rubbers may be incorporated into the anhydride copolymers by blending, mixing, or copolymerizing the monomers in the presence of the rubber. A method of preparing the rubber-modified anhydride copolymer is that taught in U.S. Pat. No. 3,919,345, wherein a rubber is dissolved in monovinyl aromatic monomer, polymerization initiated and ethylenically unsaturated dicarboxylic acid anhydride is added continuously to the polymerizing mixture at a rate sufficient to maintain the concentration of anhydride low.

Suitable rubbers, or elastomers, include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof. Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene.

Other suitable SMA polymers are prepared as described in U.S. Pat. No. 4,311,806, the disclosure of which is incorporated herein by reference. This patent teaches rubber-modified copolymers of a vinyl aryl monomer and unsaturated dicarboxylic acid anhydride. The basic polymer may also include a termonomer selected from acrylates and methacrylates and unsaturated nitrites wherein the relative proportion of monomers are 50 to 85 percent of the vinyl aryl monomer, 15 to 30 percent of the anhydride and 0 to 20 percent of the termonomer wherein the monomers are polymerized in the presence of 5 to 25 percent by weight of a rubber having a glass transition temperature below 0 degree C. The patentees also provide for blending such SMA polymers with graft copolymer of from 20 to 40 percent by weight of a monomer selected from the group comprising methyl methacrylate and acrylonitrile and 80 to 60% by weight of a vinyl aromatic monomer said copolymer being grafted onto from 10 to 60%, based on the weight of the composition, of a substrate rubber having a glass transition temperature below 0 degree C.

Styrene is preferably used in forming these polymers, but the styrene can be replaced in whole or in part by other vinyl aromatic monomers such alpha methyl styrene, chlorostyrene, bromostyrene, p-methyl styrene and vinyl toluene. Similarly the maleic anhydride can be replaced in whole or in part by another unsaturated dicarboxylic anhydride such as itaconic, aconitic or citraconic anhydride. The termonomer, where present is most preferably methyl methacrylate.

The rubber is conventionally a diene rubber such as polybutadiene or a butadiene based block or radial-block rubber. Other rubbers such as EPDM rubber, polypentenamer, polyisoprene, polychloroprene, polyacrylate rubbers and the like can, if desired, also be used.

Rubber modified copolymers are prepared by polymerizing the monomers in the presence of the rubber in such a way that a uniform copolymer of the polymerizing monomers is grafted on to the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354. The optional additional polymer component used with the SMA polymer is typically an ABS or MBS type polymer such as a diene rubber substrate grafted with styrene and either acrylonitrile, methyl methacrylate or a mixture of these monomers. However the rubber need not be the conventional polybutadiene or butadiene/styrene copolymer since any rubber with a glass transition temperature below 0 degree C can be used. Such rubbers include those which may provide the substrate for the SMA polymer described above.

The secondary migratory compatibilizer may also be a modified olefin polymer such as an acid modified propylene polymer or an acid modified ethylene polymer. The base polymer for the modified propylene can a homopolymer, a random copolymer, a block copolymer or a toughened polymer or a filled polymer of any of the above described polypropylenes. Homopolymers and copolymers are preferred most. The acid modified polyolefin may be is graft modified with a suitable amount of a carboxylic acid or a derivative thereof, with maliec anhydride being most preferred. The grafting of the polyolefin may be carried out in the melt state, in solution or in suspension as described in the state-of-the-art literature.

The composition of the invention may also include reinforcing and non-reinforcing fillers, plasticizers for the engineering resin and polyolefin, antioxidants, stabilizers, extender oils, lubricants, antiblocking agents, antistatic agents, waxes, foaming agents, pigments, and flame retardants and other processing aids known in the thermoplastic compounding art. The additives can be added at the beginning of compounding, during the compounding process or adjacent to the completion of the compounding process, provided that the total amount of the additives does not exceed about 50 weight percent, preferably about 25 weight percent, based on the total thermoplastic composition, including additives.

The material of the present invention is preferably produced by a phase inversion process in which the major polymeric portion brought into contact and dispersion with the minor polymeric portion in a thermally agitative compounding process. The thermally agitative compounding process of the present invention has resulted in the unexpected formation of polymeric compound in which a minor amount of a thermoplastic material having a typically high melt viscosity is maintained in discrete dispersed relationship in a thermoplastic material having a typically low melt viscosity. The materials are compounded and maintained relative to one another in a manner which permits reorientation of the respective materials upon remelt and subsequent mold forming processes. The unique compound retains key physical characteristics of the respective component materials while providing an integral molded workpiece.

The process of the present invention by which melt processible thermoplastic polymeric compound composition suitable for use in injection molding processes is prepared broadly comprises the steps of melt kneading a suitable amount of a melt processible thermoplastic polyamide in a suitable compounding vessel. The polyamide is brought to and maintained at a temperature sufficient to maintain it in an essentially liquid state. The initial temperature achieved is preferably above process temperatures typically permitted for thermoplastic polyolefin.

An amount of melt processible thermoplastic polyolefin is added to the agitating polyamide. Addition occurs with melt kneading in a manner which triggers a depression in process temperature to a point at or below the melt temperature of the thermoplastic polyolefin. The melt kneading is such that sufficient energy is imparted to the compounding materials to maintain the compounding materials in a generally fluid state. Compounding continues for an interval sufficient to accomplish random dispersion of discrete regions of thermoplastic polyamide in a thermoplastic polyolefin matrix after which the resulting material is permitted to cool and solidify.

Compounding preferredly occurs in a continuous process in a suitable compounding vessel. For melt-kneading, suitable kneading apparatus such as Banbury mixer, extruder, roll mill, or the like can be used. A multi-screw extruder may be advantageously used such as a twin screw extruder having multiple kneading blocks and regions to generate high shear. The type of screw configuration and shear rate is that sufficient to accomplish intimate mixture of the component portions added in the process of the present invention. Such particulars would be understood by the skilled artisan upon reading the present disclosure.

In the process of the present invention, thermoplastic polyamide of the specifications enumerated previously is added in a continuous manner into a suitable compounding vessel. Thermoplastic polyamide material may be fed into the vessel by any suitable manner which will facilitate mixing. The thermoplastic polyamide material may be introduced as granulated or pelletized material. The thermoplastic polyamide may be heated to facilitate moisture evaporation. It is to be understood that such preheating will also facilitate knead melting processes.

In the process of the present invention, the thermoplastic polyamide is processed at an initial process temperature sufficient to facilitate knead melting. It is to be understood that the upper boundary for initial process temperature is largely a function of the upper temperature stability limits of the thermoplastic polyamide employed. The lower temperature limit is largely a function of the capability of the mixing elements of the compounding vessel. The thermoplastic polymeric component materials may be heated by any means or combination of means which will achieve the desired elevated temperature level.

In the process of the present invention, the introduced thermoplastic polyamide is exposed to the first elevated processing temperature and associated kneading for an interval sufficient to maintain the thermoplastic polyamide in an essentially molten state. The temperature maximum experienced by the thermoplastic polyamide material is preferably below the temperature at which the polyamide material experiences appreciable thermal decomposition.

In the preferred embodiment of the process of the present invention, the polyamide is conveyed with suitable melt kneading to a second downstream. At this point, an amount of thermoplastic polyolefin is introduced into contact with the molten thermoplastic polyamide. The amount of thermoplastic polyolefin introduced is greater than the amount of thermoplastic polyamide present in the formulating vessel. Typically, the amount of polyolefin to be introduced is an amount greater that a 1:1 ratio (w/w) of polyolefin to polyamide, with a weight to weight ratio of greater than 1.2:1 being desirable and a ratio of greater than 2:1 being preferred, the exact ratio to be determined by the end use to which the polymeric composition of the present invention is to be employed.

As indicted previously, the thermoplastic polyolefin of choice is at least one material selected from homopolymers and copolymers having one alkylene monomeric unit which making up the homopolymeric or copolymeric group with the alkylene monomeric functionality, preferably, containing 2 to 6 carbon atoms in branched or unbranched monomeric units, with alkylene monomers having two three or four carbon atoms being preferred and polymers having at least some propylene groups being most preferred. The thermoplastic polyamide of choice is preferably is selected from at least one of nylon 6, nylon 6,6, nylon 11, and nylon 12, with nylon 6 being preferred.

In order to obtain desired polyamide to polyolefin ratios indicated previously, the polyolefin material can be introduced at a rate and in a manner which permits effective integration of the polyolefin with the polyamide. In the process of the present invention, the polyolefin is added in a manner sufficient to depress the process temperature of the molten material contained in the formulating vessel to a temperature below the first elevated temperature. The temperature depression which occurs is one which achieves a second temperature sufficient to maintain the added polyolefin in an essentially molten state in which the added polyolefin can be incorporated into the polyamide. The temperature of choice will be one which maintains polyamide and introduced polyolefin in mixable state while minimizing thermal degradation of the introduced polyolefin.

Without being bound to any theory, it is believed that initial portions of the introduced polyolefin may be exposed to transitory temperatures above the generally held optimum melt temperature limits for the polyolefin without experiencing appreciable thermal degradation. It is theorized that this is due, at least in part to the significant mass of polyolefin added to the compounding vessel over a relatively short interval. Preferably, the polyolefin material is added as a granular or pelletized solid. As such, the temperature, mass and relative surface area of the added material serve to provide both transitory and lasting temperature depression events which effectively insulate the polyolefin from degrading thermal events.

Introduction of the polyolefin is typically accomplished by suitable means for distributive mixing to assure thorough dispersion of the resident polyamide in the polyolefin being introduced. Thus the knead melting apparatus described previously can be employed in the compounding vessel which will accomplish the desired knead melting and distributive mixing. The polyolefin addition process is preferably accomplished under high shear turbulent conditions to insure the thorough compounding of the two materials.

The compounding event which occurs in the process of the present invention is largely the result of physical compounding. The term "physical compounding" is employed to define and describe the discrete physical relationship of the two respective thermoplastic materials. While the materials remain in a dispersed state relative to one another, the two materials retain discrete regions of identifiable polyamide and polyolefin material with little evidence of chemical bonding between the two thermoplastic materials. Thus the materials are present in dispersed but orientable relationship to one another as a result of the process of the present invention.

Knead melting of molten thermoplastic polyamide and added thermoplastic polyolefin proceeds for an interval sufficient to accomplish random dispersion of discrete regions of thermoplastic polyamide in a thermoplastic polyolefin matrix.

In the process of the present invention, once compounding is complete, the resulting material can be cooled to a temperature below which solidification of the resulting thermoplastic compound occurs with appropriate pelletization and the like.

In the preferred embodiment of the present invention at least one suitable migratory compatibilizing agent may be introduced into composition during the compounding process to facilitate the successful compounding of the two polymeric components and to further facilitate migration and orientation of the two polymeric components during subsequent molding and processing operations. In the preferred embodiment the at least one primary migratory compatiblizing agent is introduced into contact with the thermoplastic polyamide during the initial compounding stage.

The primary migratory compatibilizing agent is preferably a material such as a silicone oil (sometimes referred to as siloxane oil) which will form platelets which ultimately will migrate to the interface between the polyamide and polyolefin material as orientation progresses during molding or extrusion processes. It is theorized that these primary migratory compatibilizing agents remain essentially non-reactive to with the polyamide and polyolefin materials during initial compounding but function in molding or extrusion operations to provide binding regions to which the two components can attach during the orientation upon molding. It is this phenomenon which is referred to as migratory compatibilization.

The primary migratory compatibilizing agent is essentially non reactive the polyamide and subsequently added polyolefin constituents while resident in the compounding vessel and undergoing kneading. The primary migratory compatibilizing agent of choice will be one having sufficient functionality to align and orient between polyamide-rich regions and polyolefin-rich regions when the compounded material has been subjected to injection molding or extrusion procedures. Without being bound to any theory, it is believed that the primary migratory agent concentrates in the gradient between the polyamide rich outer skin and the polyolefin-rich interior provides an interstitial mechanical and quasi-chemical bonding region in and at the gradient interface between the polyamide rich outer skin and the polyolefin-rich interior. The primary migratory agent is preferably present in an amount sufficient to promote polyamide/polyolefin cohesion. Typically amounts between 0.1 and 5.0 weight % can be successfully employed with amounts between 0.1 and 1.0% being preferred.

When desired a secondary migratory compatibilizing agent can be introduced and integrated into the composition of the present invention. The secondary migratory compatibilizing agent is typically a material which is classically referred to as a functional compatibilizer and, heretofore has been employed to insure essentially homogeneous integration of one polymeric component relative to another. It has been found, quite unexpectedly that the incorporation of less than functionalizing quantities of a second migratory compatibilizing agent into a the polyamide component prior to the addition of the polyolefin results in effective formation of polyamide islands into the polyolefin matrix in a manner which facilitates uniform product flow during injection molding or processing operations such as extrusion. Without being bound to any theory, it is believed that the incorporation of secondary migratory compatibilizing agent in less that optimal functionalizing quantities provides sufficient minimal functionality to enhance migratory distribution while avoiding excess reaction between the functional sites and the associated polymeric components. Thus the amount of secondary migratory compatibilizer employed may range from zero to am amount below the amount typically required for effective functionalization for the associated polyamide and polyolefin components.

Referring now to FIG. 2, there is shown a schematic representation of a suitable compounding vessel 100 for use in the process of the present invention. The compounding vessel 100 has a first end 102 and a second end 104. The compounding vessel 100 will include suitable means 106 for introducing polyamide material into the interior of the compounding vessel 100. The means 106 are preferably located proximate to the first end of vessel 100 will be connected to suitable mechanisms for feeding polyamide material into the interior of the compounding vessel 100. As depicted in FIG. 2, The introduction means 106 can include a suitable hopper 108 and screw feed mechanism 110 calibrated to deliver particulate polyamide to the interior of the compounding vessel 100. It is to be understood that the polyamide material can be delivered in any form suitable for subsequent processing. Thus while particulate, granular or pelletized material is delivered into the compounding vessel as depicted in FIG. 2, the polyamide may be delivered in a melted state.

The compounding vessel 100 also has suitable auxiliary introduction ports 112 to accommodate the introduction of other components at or near the introduction point of the polyamide material. Such ports 112 are adapted to communicate with various feed devices as would be necessary to introduce pigments impact modifiers in the form of liquids and oils and the like into the material to be compounded. Examples of such feed devices include hoppers 126 and 128. As depicted in FIG. 2, the compounding vessel has at least one auxiliary port 112 located downstream of the polyamide introduction port 106 to facilitate the introduction of a migratory binder agent such as silicone oil. As depicted in FIG. 2, suitable means 114 for introducing additional component are associated with the introduction port 112. These introduction means 114 include mechanisms and devices necessary to accomplish the introduction of the desired material into the interior of the reaction vessel. As depicted in FIG. 2, the introduction means 114 includes a suitable fluid pump 116 as well as associated metering and measurement devices to accomplish controlled addition of liquid materials such as silicone oils and the like. It is to be understood that a material such as silicone oil may be added at one or multiple ports as desired or required to facilitate proper introduction of the additive to the polyamide phase.

The interior of the compounding vessel may be jacketed by a suitably inert atmosphere to prevent or retard oxidation of at least one of the materials being compounded. Thus, the compounding vessel 100 of the present invention may have suitable means for delivering an suitable inert gas into the interior of the reaction vessel 100 (not shown). Where employed the jacketing gas may be any one which will prevent or impede oxidation of the components and/or resulting polymeric composition. Examples of such gasses include nitrogen, or other suitable gasses. Typically, a blanketing gas such as nitrogen is added though at least one compound feed port, but preferably at all feed ports to insure proper blanketing during processing.

Upon introduction, the materials are brought to proper temperature to ensure proper melting of the polyamide. The material is subjected to knead mixing for an interval sufficient to insure proper consistency for the addition of thermoplastic polyolefin. Knead melting may be accomplished by any suitable mixing mechanism.

The appropriate knead melt mechanism is positioned in the interior of the compounding vessel and is powered by a suitable power source and mechanism 118. The power source of mechanism 118 is sufficient to provide appropriate kneading, mixing and melt environment to compound the material desired.

The amount of polyamide material is introduced into the interior of the compounding vessel 100 is typically in the desired formula weight amount The compounding device 100 of the present invention may be equipped with appropriate measuring devices, metering devices, scales and computational equipment to ensure that the desired ratio is achieved.

The knead melt mechanism employed in the interior of the compounding vessel 100 is appropriately configured to achieve appropriate mixing and compounding. It is anticipated that the first entry region of the compounding vessel will be one which facilitates the melting and temperature elevation of the introduced polyamide material.

The reaction vessel also includes suitable means 120 for introducing polypropylene into the interior of the compounding vessel. The introduction point for the polyolefin, such as polypropylene, is located downstream of the polyamide introduction point. Preferably, the polyolefin introduction point 122 is staged at a location in the process stream where the previously introduced polyamide is experiencing a ramp down in material temperature. The previously introduced polyamide material may be permitted to cool down to a second lower temperature with concomitant increases in agitation turbulence. At this point, the polyolefinic material, preferably polypropylene, is added. The polypropylene material is preferably added as a particulate, granular or pelletized solid. Addition of the polypropylene induces a marked temperature decrease in the processing polyamide material with concomitant melting of the polypropylene. In other words, the polyamide cools as it contacts the polypropylene. At this lowered temperature, the polyamide material entrained in the now melting or melted polypropylene, begins to freeze. The intense agitation which is simultaneously occurring induces the solidifying or freezing polyamide to form extremely small "islands" in the polypropylene matrix.

Melt kneading continues at this lowered temperature for an interval to insure the proper distribution of the freezing and frozen polyamide in the polypropylene matrix. Intense agitation, turbulence and/or shear keeps the polypropylene from attaining its solidified state. However, the quasi-solid nature of the polypropylene in connection with the frozen polyamide material provides for the discrete distinct dispersion of micro cells of polyamide in the discrete quasi-solid polypropylene.

In order to further induce the polypropylene to remain in a quasi-fluidic state, the material can be exposed to minimal vacuum pressure to depress the melt temperature of the two respective materials. During this stage, the compounding material is, preferably, exposed to a sequence of reverse kneading and heat. It is to be understood that the heating can be derived from the frictional nature of the reverse kneading process. However, additional heat may be employed as necessary to maintain the material at the desired processing consistency.

At the second end 104 of the reaction vessel, the material is permitted to exit through an appropriate pelletizing dye. Preferably, the material is cured such as by water or air upon exit to form discrete pellets of the resulting material.

The resulting polymeric composition demonstrates unique attributes upon exposure to temperature differentials present in injection molding or extrusion operations. The material exhibits essentially homogenous flow characteristics with orientation of polyamide relative to the polyolefin such that the resulting workpiece demonstrates a polyamide rich skin surrounding a polyolefin rich core with first or primary migratory compatibilizer present in elevated at quantities interfacial regions between the polyamide polymer outer region and the polyolefin inner region.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A melt-processable polymeric material comprising:
   a major portion of an olefinic polymer component selected from the group consisting of polyalkylenes, copolymers of polyalkylenes, and mixtures thereof, the olefinic polymer component further characterized in that at least one alkylene monomer thereof contains from 2 to 6 carbon atoms;
   a minor portion of a polyamide polymer component randomly discretely dispersed within the major portion, the polyamide polymer component selected from the group consisting of thermoplastic polyamides, and mixtures thereof; and
   at least one compatibilizer present in an amount sufficient to promote relative orientational positioning of the major olefinic portion and the minor polyamide portion upon application of an orientational inducement force.

2. The melt processable polymeric material of claim 1, wherein the at least one compatibilizer is a material capable of promoting bonding at interfacial locations between the polyamide polymer component and the olefinic polymer component.

3. The melt processable polymeric material of claim 2, wherein the at least one compatibilizer is selected from the group consisting of organisiloxane-functional organic compounds, and mixtures thereof.

4. The melt processable polymeric material of claim 3, wherein the at least one compatibilizer is a siloxane oil.

5. A melt-processable polymeric material comprising:
   a major portion of an olefinic polymer component having a first melt flow index, the olefinic polymer component selected from the group consisting of polyalkylenes, copolymers of polyalkylenes, and mixtures thereof, the olefinic polymer component further characterized in that at least one alkylene monomer thereof contains from 2 to 6 carbon atoms;

a minor portion of a thermoplastic polyamide component, the thermoplastic polyamide component having a second melt flow index higher than the first melt flow index; and at least one compatibalizer present in an amount sufficient to promote relative orientational positioning of the major olefinic portion and the minor polyamide portion upon application of an orientational inducement force.

6. The melt processable polymeric material of claim 5, wherein the at least one compatibilizer is a material capable of promoting bonding at interfacial locations between the thermoplastic polyamide component and the olefinic polymer component.

7. The melt processable polymeric material of claim 6, wherein the at least one compatibilizer is selected from the group consisting of organisiloxane-functional organic compounds, and mixtures thereof.

8. The melt processable polymeric material of claim 7, wherein the at least one compatibilizer is a siloxane oil.

9. The melt-processable polymeric material of claim 6, wherein the thermoplastic polyamide component is selected from the group consisting of polyamide 6, polyamide 11, polyamide 12, and mixtures thereof.

10. The melt-processable polymeric material of claim 6, wherein the olefinic polymer component is present in an amount of between about 40% and about 95% by weight, and wherein the thermoplastic polyamide component is present in an amount of between about 10% and about 35% by weight.

11. A molded workpiece having at least one outwardly oriented surface and an interior region, the molded workpiece composed of a thermoplastic material comprising:

an olefinic polymer component selected from the group consisting of polyalkylenes, copolymers of polyalkylenes, and mixtures thereof, the olefinic polymer component further characterized in that at least one alkylene monomer thereof contains from 2 to 6 carbon atoms;

a polyamide polymer component; and at least one compatibilizer;

wherein the polyamide polymer component is present at elevated concentrations relative to the olefinic polymer component at a region proximate the outwardly oriented surface of the workpiece, and the olefinic polymer component is present at elevated concentrations relative to the polyamide polymer component in the interior region of the workpiece, and wherein the at least one compatibilizer is present at interfacial regions between the polyamide polymer component and the olefinic polymer component.

12. The molded workpiece of claim 11, wherein the olefinic polymer component is selected from the group consisting of polypropylene, copolymers of polypropylene, and mixtures thereof.

13. The molded workpiece of claim 11, wherein the olefinic polymer component is selected from the group consisting of polyethylene, copolymers of polyethylene, and mixtures thereof.

14. The molded workpiece of either claim 12 or 13, wherein the polyamide polymer component is selected from the group consisting of polyamide 6, polyamide 11, polyamide 12, and mixtures thereof.

15. The molded workpiece of claim 11 or 14, wherein the at least one compatibilizer is selected from the group consisting of organisiloxane-functional organic compounds, and mixtures thereof.

16. The molded workpiece of claim 15, wherein the at least one compatibilizer is a siloxane oil.

17. A method for preparing a melt-processable polymeric composition, comprising the steps of:

providing a compounding vessel;

providing an amount of a thermoplastic polyamide having a first elevated processing temperature;

providing an amount of a thermoplastic polyolefin that is greater than the amount of the thermoplastic polyamide, the thermoplastic polyolefin having a second elevated processing temperature that is lower than the first elevated processing temperature, and wherein the thermoplastic polyolefin is maintained at a temperature below the first elevated temperature;

providing an amount of at least one compatibilizer that is essentially non-reactive with the thermoplastic polyolefin and thermoplastic polyamide while resident in the compounding vessel;

agitating the thermoplastic polyamide in the compounding vessel for an interval and at a temperature sufficient to maintain the thermoplastic polyamide in an essentially molten state;

adding the at least one compatibilizer to the agitating thermoplastic polyamide;

adding the thermoplastic polyolefin to the agitating thermoplastic polyamide, wherein the addition of the thermoplastic polyolefin results in a temperature decrease to a temperature that is sufficient to maintain the added thermoplastic polyolefin in a molten state;

compounding the molten thermoplastic polyamide and molten thermoplastic polyolefin for an interval sufficient to randomly disperse the thermoplastic polyamide in the thermoplastic polyolefin; and cooling the molten dispersion to a temperature below which solidification of the resulting thermoplastic compound occurs.

18. The method of claim 17, wherein the step of providing an amount of theremoplastic polyolefin further comprises selecting the theremoplastic polyolefin from the group consisting of polyalkylenes, copolymers of polyalkylenes, and mixtures thereof, the theremoplastic polyolefin further characterized in that at least one alkylene monomer thereof contains from 2 to 6 carbon atoms.

19. The method of either claim 17 or claim 18, wherein the step of providing an amount of at least one compatibilizer further comprises selecting the at least one compatibilizer from the group consisting of organisoloxanefunctional organic compounds, and mixtures thereof.

20. The method of claim 19, wherein the step of providing an amount of a least one compatibilizer comprises providing a siloxane oil.

21. The method of claim 17, wherein the step of providing an amount of theremoplastic polyolefin comprises providing an amount of between about 40% to 95% by weight, and wherein the step of providing an amount of theremoplastic polyamide comprises providing an amount of between about 10% and about 35% by weight.

22. The method of claim 17, wherein the step of providing an amount of thereoplastic polyamide further comprises selecting the thermoplastic polyamide from the group consisting of polyamide 6, polyamide 11, polyamide 12, and mixtures thereof.

* * * * *